United States Patent [19]
Closson

[11] Patent Number: 5,948,711
[45] Date of Patent: Sep. 7, 1999

[54] BARRIER FABRIC FOR INCONTINENT MATERIAL

[76] Inventor: Addison W. Closson, 31 Linnaean St., Apartment 3, Cambridge, Mass. 02138-1530

[21] Appl. No.: 08/909,652

[22] Filed: Aug. 12, 1997

[51] Int. Cl.⁶ ................................................ B32B 27/00
[52] U.S. Cl. .................... 442/398; 442/183; 442/240; 442/245; 442/247; 442/261; 442/271; 442/290; 442/319; 442/381
[58] Field of Search ................................. 442/183, 240, 442/245, 247, 261, 271, 290, 319, 381, 398

[56] References Cited

U.S. PATENT DOCUMENTS

| | | | |
|---|---|---|---|
| 4,726,976 | 2/1988 | Karami et al. | 428/137 |
| 5,009,653 | 4/1991 | Osborn, III | 604/385.1 |
| 5,085,653 | 2/1992 | Levy | 604/358 |
| 5,368,910 | 11/1994 | Langdon | 428/137 |

*Primary Examiner*—Helen L. Pezzuto
*Attorney, Agent, or Firm*—Samuels, Gauthier & Stevens

[57] ABSTRACT

A laminae construction for an incontinent material A porous face fabric is secured to a soaker fabric. A barrier fabric is secured to the soaker fabric. The barrier fabric is of two ply construction, a film of crystalline polypropylene and a fabric substrate secured to the soaker fabric. The laminae construction can resist degradation at laundering temperatures of up to 130° C.

6 Claims, 1 Drawing Sheet

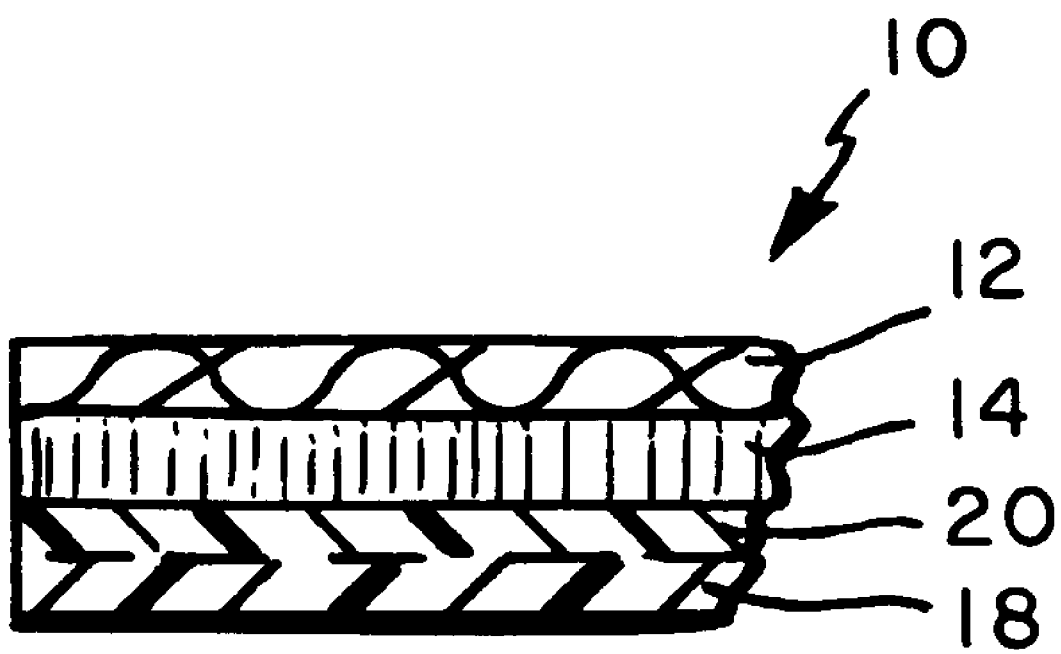

BARRIER FABRIC FOR INCONTINENT MATERIAL

BACKGROUND AND BRIEF SUMMARY OF THE INVENTION

Presently, there are two basic polymers used in laminae constructions for health care coated incontinent fabric barrier materials. In Europe, for environmental reasons, urethane coatings are frequently used as the barrier film and knitted fabrics are adhered to one or both sides of the core urethane moisture barrier film. In the United States, for economic reasons, the barrier film of choice is polyvinyl chloride (PVC) which is laminated to a knitted or woven fabric, usually on one side only. A major difficulty with using polyvinyl chloride is that when incontinent material is ultimately disposed of by burning there are emissions including free chlorine radicals and dioxin. In addition, some PVC has plasticizing oils in the phthalate family which are suspected of having estrogen receptor activity in humans.

There are two major markets for the incontinent barrier fabric. One is the retail market where the fabric is sold as pads to be disposed of by the customer or washed in home laundries and used only a few times.

The other market, and the market to which the present invention is primarily directed, is the commercial laundry market, comprising users such as hospitals, nursing homes, care centers, etc. In this market, the incontinent barrier material is sold primarily as laminated roll goods to cut and sew factories where it is fabricated into absorbent pads for commercial laundering. In this market, the pads are subjected to high temperatures during the laundering and drying in order to sterilize them. The primary use is to protect bedding from fluid. The incontinent material in this market is not disposable but reused many times. This material is typically laundered up to one hundred times or more before it is ultimately disposed of by incineration.

For the incontinent coated barrier fabric, high heat resistance is needed to prevent cracking, peeling or leaking of the fabrics when they are laundered. Further, it would be desirable to provide an incontinent material of less weight than prior art incontinent materials because laundering charges are based on weight.

The present invention is directed to an incontinent material construction of less weight than prior art materials. The barrier film side of the fabric is non-polar which helps in the removal of the detritus material on the surfaces more easily, does not become as permanently soiled with extended use as with prior art materials, dries more readily, does not wick around the edges and is totally recyclable when laminated to a polypropylene or olefin fabric. The face fabric is a prior art material, preferably a polyester or polypropylene knit, woven or non-woven fabric having a weight of 0.5 to 4.0 oz/yd$^2$. The soaker fabric is a prior art material, such as a polyester/rayon 50/50 blend needled material 4 to 8 oz/yd$^2$. In the preferred embodiment, the laminated film barrier fabric is a combination of a blend of high crystalline and medium crystalline olefinic materials, preferably polypropylene textile and barrier resins. Alternatively, a single olefinic resin exhibiting the same properties can be used. This film is laminated to a textile-like substrate of a woven or non-woven material. The olefinic barrier fabric has a weight of 1 to 7 oz/yd$^2$. The total weight of the incontinent material of the invention is typically 30% less than prior art vinyl and urethane materials.

The porous face fabric and absorbent soaker non-woven per se can withstand (without deleterious effects) the repeated laundering at temperatures up to 130° C. The barrier fabric of the invention is formulated to withstand laundering at temperatures of up to 130° C. Heretofore, olefin coated barrier fabrics would melt and stick together or otherwise degrade and loose their flexibility with such laundering. The incontinent material construction of the invention will not degrade when laundered (drying cycle) at temperatures of up to 130° C.

BRIEF DESCRIPTION OF THE DRAWINGS

The figure is an illustration of an incontinent construction embodying the invention.

DESCRIPTION OF THE PREFERRED EMBODIMENT(S)

Referring to the figure, an embodiment of an incontinent material of the invention is shown generally at 10 and comprises a porous face fabric 12 such as a polypropylene knit or woven fabric 0.5 to 4.0 oz/yd$^2$, quilted to a soaker fabric 14 such as a polyester/rayon blend 4 to 8 oz/yd$^2$ and a laminated olefinic polypropylene barrier fabric 16. The fabric comprises a lamination of an polypropylene film 18 bonded to a knit woven or non-woven textile substrate 20. The substrate can be a fabric-like polyethylene, polyester or polycotton, woven or non-woven. The fabric has a weight of from 1 to 7 oz/yd$^2$.

The finished incontinent pad 10 construction comprises the soaker fabric 14 adhered at the edges or quilted to one side of the face fabric 12. The olefinic barrier fabric 16 is secured to the other side of the soaker fabric 14 usually stitched at the edges only.

When the fabrics 12, 14 and 16 are cut and sewn together, typically they can be in roll or sheet form. The top plys are quilted, layered, cut and stitched along the edges and then an edge tape is secured thereto to form the incontinent pad.

The advantages of the construction of the present invention results in a washable material of less weight than the prior art materials, typically a weight savings of approximately 20% over prior art materials, can withstand repeated washings, e.g. 100 washings, and will not melt or degrade during laundering at drying at temperatures of about 130° C. more or less. The face fabric is preferably not polar and therefore contaminants do not adhere well to the surface, the surface does not get as soiled and the material dries faster. Further, there is little or no wicking around the edges of the olefin coated barrier fabric. Lastly, the construction of the barrier fabric of the invention is totally recyclable when used with a polypropylene fabric and polypropylene barrier film.

EXAMPLE

A barrier fabric was made as follows: 70% high crystalline flexible polyproylene, 30% medium crystalline flexible polyproylene was blended. This blend was extruded in a film thickness of 3 to 10 mils corresponding to a weight of 2 to 8 oz/yd$^2$, preferably about 5 oz/yd$^2$. The film as extruded was adhered to polypropylene fabric of a circular knit terry-loop toweling of about 2.5 oz/yd$^2$.

This fabric 16 was layered with the soaker fabric 14, specifically a rayon/ polyester 50/50 needled felt, about 6 oz/yd$^2$, and the face fabric 12, specifically bird's eye construction of polypropylene, about 2–5 oz/yd$^2$. These materials were quilted, cut and edges stitched together to form the incontinent material 10. The incontinent material had sufficient heat resistance to withstand the laundering commercial dryer temperatures retaining moisture impermeable properties on one side, strength and 'hand' e.g. flexibility for comfort and durability.

The polypropylene used for the filmic blend are commercially available from Rexene Corp., Dallas, Tex., tradename Rexflex FPO, specifically the medium crystalline polyethylene is W102 and the high crystalline polyethylene can be either W107 or W108. Typical properties of the medium crystalline polyethylene would be melting point 186° C., density 0.89 g per cc, shore hardness, D scale 53, tensil modulus KpH 20 and Vicat softening point 70° C. For the 107 high crystalline polypropylene, the melting point is 159° C., density 0.89, shore hardness, D scale 83, tensil modulus KpH 56, and Vicat softening point 111° C.

The preferred embodiment of the invention has been described with reference to the use of the above-identified barrier film comprising crystalline and flexible crystalline polypropylene in a blend of 70% more crystalline polypropylene and 30% less crystalline polypropylene. These olefinic blends of higher crystallinity and medium crystallinity can range respectively between 95/5 to 50/50 and can be ethylene, propylene, butylene and polar or non-polar.

The foregoing description has been limited to a specific embodiment of the invention. It will be apparent, however, that non-polar olefinic variations and modifications can be made to the invention, with the attainment of some or all of the advantages of the invention. Therefore, it is the object of the appended claims to cover all such variations and modifications as come within the true spirit and scope of the invention.

Having described my invention, what I now claim is:

1. A laminae construction for incontinent material which consists of:

a non-woven soaker fabric;

a porous face fabric secured to one side of the soaker fabric; and a laminated barrier fabric which comprises a heat resistant film of a blend of non-polar, flexible high crystallinity polypropylene, the high crystallinity polypropylene having a melting point of about 159° C., a density of about 0.89 g per cc, a D scale of about 83, a tensile modulus KpH of about 56 and a Vicat softening point of about 111° C., and medium crystallinity polypropylene, the medium crystallinity polypropylene having a melting point of about 186° C., a density of about 0.89 g per cc, a shore hardness, a D scale of about 53, a tensile modulus KpH of about 20 and a Vicat softening point of about 70° C., in a range of between about 90/10 to 10/90 respectively and a fabric substrate, the fabric substrate secured to the other side of the soaker fabric wherein the barrier fabric has a weight in a range of between 1 to 7 oz/yd$^2$, said laminae construction being characterized by resistance to degradation when laundered at a temperature of up to 130° C.

2. The construction of claim 1 wherein the barrier substrate is a polypropylene knit or woven.

3. The construction of claim 2 wherein the barrier substrate has a weight of between about 0.25 to 6.0 oz/yd$^2$.

4. The construction of claim 1 wherein the non-woven soaker fabric is selected from the group consisting of polypropylene, polyester, acrylic or rayon.

5. The construction of claim 4 wherein the soaker fabric has a weight of between about 2 to 10 oz/yd$^2$.

6. The construction of claim 1 wherein the fabric substrate is polypropylene.

* * * * *